United States Patent [19]
Books

[11] Patent Number: 4,460,729
[45] Date of Patent: Jul. 17, 1984

[54] POLYESTER COMPOSITION

[75] Inventor: Jeffrey T. Books, Baton Rouge, La.

[73] Assignee: Ethyl Corporation, Richmond, Va.

[21] Appl. No.: 377,922

[22] Filed: May 13, 1982

[51] Int. Cl.$^3$ ............................................. C08L 67/02
[52] U.S. Cl. .................... 524/394; 524/513; 525/177
[58] Field of Search ................. 524/394, 513; 525/177

[56] References Cited
U.S. PATENT DOCUMENTS

| | | | |
|---|---|---|---|
| 3,575,931 | 4/1971 | Sherman | 524/104 |
| 3,673,139 | 6/1972 | Hrach | 260/DIG. 35 |
| 3,769,260 | 10/1973 | Segal | 524/494 |
| 4,122,061 | 10/1978 | Holub | 525/177 |
| 4,219,628 | 8/1980 | Weemes | 525/166 |
| 4,290,937 | 9/1981 | Cohen | 524/451 |
| 4,327,007 | 4/1982 | Vanderkooi | 524/394 |
| 4,327,198 | 4/1982 | Weemes et al. | 525/63 |
| 4,351,757 | 9/1982 | Haeschele | 524/513 |

FOREIGN PATENT DOCUMENTS

| | | |
|---|---|---|
| 993770 | 6/1965 | United Kingdom. |
| 1104089 | 2/1968 | United Kingdom. |
| 1208585 | 10/1970 | United Kingdom. |

*Primary Examiner*—John C. Bleutge
*Assistant Examiner*—Patricia Short
*Attorney, Agent, or Firm*—Donald L. Johnson; John F. Sieberth

[57] ABSTRACT

Improved injection moldability of polyethylene terephthalates is achieved by the addition of small amounts of (i) a poly-α-olefin and (ii) an adjuvant synergistically cooperative with the poly-α-olefin to achieve improved moldability and mold releasability even when the composition is injection molded at temperatures of at least as low as 93° C.

5 Claims, 1 Drawing Figure

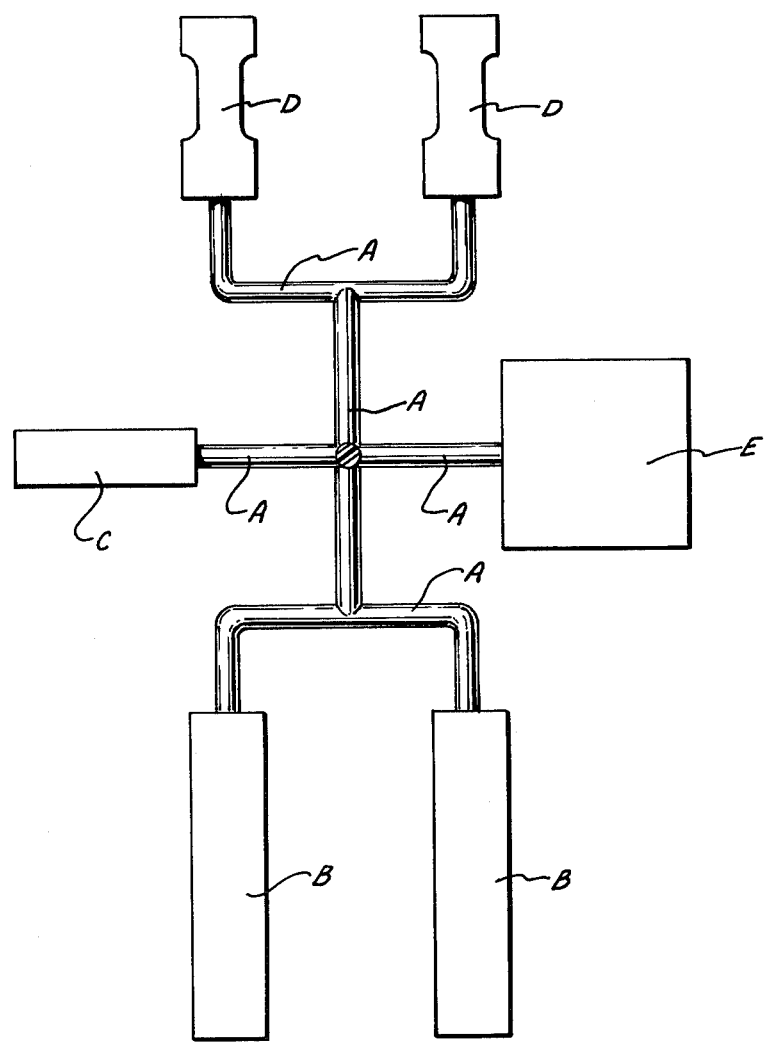

POLYESTER COMPOSITION

TECHNICAL FIELD

This invention relates to thermoplastic polyester compositions which are especially useful for injection molding operations conducted at relatively low mold temperatures.

BACKGROUND

It has long been known that polyethylene terephthalate (PET) has superior physical properties, e.g., resistance to chemical attack, and desirable mechanical and electrical properties. Despite these superior physical properties, PET is not always the material of choice for injection molding usage because relatively high mold temperatures, e.g., 120°–140° C., must be utilized to insure good moldability. Any attempt to use a lower mold temperature, e.g., 100 ° C. or lower, results in the injected material being unmoldable as, for one thing, the molded article sticks in the mold and often can only be removed with great difficulty. To circumvent this processing disadvantage, the molder is forced to select more expensive materials such as polybutylene terephthalate (PBT), inasmuch as this poly(alkylene terephthalate) is easily moldable even when using mold temperatures as low as 60° C. By being able to use a lower mold temperature for PBT, the time necessary for cooling the injection molded article to a temperature at which it can be removed from the mold is considerably shorter than the cooling time necessary before the PET article can be removed from its initially hotter mold. Since this shorter cooldown period of PBT results in a shorter process cycle time and a higher rate of article production, economic justification exists for its use despite its higher unit cost.

A welcome contribution to the art would be a PET composition which can be injection molded at relatively low mold temperatures (e.g., 100 ° C. and below) to yield articles exhibiting good moldability characteristics, e.g., good mold releasability and desirable physical properties.

THE INVENTION

In accordance with this invention there is provided a thermoplastic injection moldable composition which comprises an intimate admixture of:

(a) a polyethylene terephthalate;

(b) a poly-α-olefin resin formed from one or more acyclic hydrocarbon α-olefins containing at least two but no more than about eight carbon atoms in the repeating unit; and (c) an adjuvant synergistically cooperative with the poly-α-olefin of (b) to improve the releasability, from the injection mold, of articles injection molded from said composition at mold temperatures of at least as low as 93° C.

Because of the synergistic cooperation between the components (b) and (c) above, the compositions may be molded at relatively low mold temperatures (e.g., in the range of about 50° C. to about 100 ° C.) without excessive sticking being encountered.

It will be understood, of course, that if desired, the compositions of this invention may be injected molded at even higher mold temperatures (e.g., about 100° to about 150° C.).

A further aspect of this invention is that the compositions may additionally contain reinforcing amounts of a reinforcing filler, e.g., glass fibers. Other additives may also be used in the composition such as flame retardants, impact modifiers, viscosity stabilizers, color stabilizers and the like.

The polyethylene terephthalate used herein is preferably homopolymeric PET although crystallizable PET copolymers may also be used. Exemplary of useful PET copolymers are those copolymers in which the copolymer contains at least 80 mol percent of repeating units derived from terephthalic acid and ethylene glycol with the remainder (20 mol percent or less) being derived from other well known acid and/or glycol components. Representative acid components are phthalic acid, isophthalic acid, naphthalene 1,4-or 2,6-dicarboxylic acid, diphenyl-4,4'-dicarboxylic acid, diphenyl ether-4,4'-dicarboxylic acid, adipic acid, sebacic acid as well as their halogenated (preferably brominated) counterparts. The glycol components may be diethylene glycol, neopentyl glycol, cyclohexanedimethanol, 2,2-bis(4-hydroxyphenyl) propane, 1,3-propanediol, 1,4-butanediol, dibromoneopentyl glycol, the bis(2-hydroxyethyl) ether of tetrabromobisphenol A, tetrabromo-p-xylylene glycol and the like.

The polyethylene terephthalates used herein can be virgin PET or reclaimed PET. Also the PET used in the compositions of this invention is injection moldable and thus generally will have an intrinsic viscosity (I.V.) as low as 0.3 and preferably between about 0.4 and 1.2, and most preferably between about 0.5 and 1.0, as measured at 25° C. in a solvent consisting of 60 percent by weight phenol and 40 percent by weight of tetrachloroethane. For most injection molding applications polyethylene terephthalates in which the I.V. is in the range of 0.4 to 0.9 are most preferred.

With the polyethylene terephthalates described above, there is added components (b) and (c), as noted previously, to yield the highly moldable compositions of this invention.

These compositions preferably have an amount of the poly α-olefin resin within the range of from about 0.5 to about 12 parts per hundred parts of PET and an amount of the adjuvant within the range of from about 0.05 to about 5 parts per hundred parts of PET. Most preferably, the amounts of these components used fall, per hundred parts of PET, within the range of from about 2 to about 8 parts of the poly- α-olefin resin and from about 0.1 to about 3 parts of the adjuvant.

Without the use of the adjuvant, which coacts synergistically with the above described poly-α-olefins, there is no observed significant enhancement of PET moldability. (Also it has been demonstrated that the use of the adjuvant without the polyα-olefin is likewise without moldability benefit.) In view of the impotence of the poly-α-olefin and adjuvant when used individually, it is notable that their use in combination gives the very noticeable moldability enhancement which characterizes this invention.

As an adjuvant, sodium stearate is highly preferred for its synergistic coaction with the poly-αolefins of this invention. In view of the coactive synergistic performance shown by sodium stearate, it is contemplated that other alkali metal salts of substantially saturated aliphatic monocarboxylic acids will likewise perform synergistically when used pursuant to this invention. Exemplary of such monocarboxylic acid salts are sodium acetate, potassium acetate, sodium propionate, potassium propionate, sodium hexoate, sodium octoate, sodium decanoate, sodium laurate, potassium laurate, sodium tetradecanoate, sodium hexadecanoate and the like. Also commercially available soaps, such as IVORY soap (which is manufactured by The Procter and Gamble Company of ( Cincinnati, Ohio, and reported to contain sodium cocoanate and sodium salt of hydrogenated tallow oil), are deemed useful as synergistic adjuvants. A preferred class of adjuvants comprises the alkali metal salts of substantially saturated aliphatic monocarboxylic acids having from about 12 to about 36 carbon atoms in the molecule and of these, the alkali metal salts of the acids containing from about 16 to about 30 carbon atoms in the molecule are especially preferred. Potassium myristate, sodium palmitate, sodium stearate, potassium stearate, sodium behenate, and sodium montanate serve as examples of such materials. The potassium salts and especially the sodium salts of the above-described acids are most preferred, however, the lithium, cesium and rubidium salts, while not as available and economical, should perform satisfactorily with the α-olefin acrylic acid copolymer to achieve the moldability enhancement sought.

The poly-α-olefin resin used as component (b) of the composition of this invention can be a homopolymer or it can be a copolymer (i.e., a polymer made from two or more non-cyclic α-olefinic hydrocarbons, each of which contains no more than about 8 carbon atoms). Of the copolymers, those in which one of the monomers is ethylene are preferred. Illustrative of such resinous polymers are: ethylene, propylene, 1,6-hexadiene terpolymer, polyethylene (high, medium and low density); polypropylene; poly-4-methyl-1-pentene; poly 1-octene; ethylene-propylene copolymers; ethylidene norbornene terpolymer; ethylene-1-butene copolymers; ethylene-propylene-1-butene terpolymers, linear low-density polyethylene containing at least about 90% ethylene repeating units, and, as the balance of the repeating units, higher olefins such as butene, pentene, heptene, octene and the like; etc. Giving especially good moldability, in synergistic cooperation with the before described adjuvants, is polyethylene having a viscosity within the range of from about 150 to about 700 centipoise as measured at 140° C. with a Brookfield viscometer. Another poly-α-olefin which is highly preferred is amorphous, i.e., atactic, polypropylene.

As mentioned previously, other additives may also be utilized in the composition of this invention. For example, it is most useful if the composition additionally contains a reinforcing filler. This filler, depending on its nature, can increase the strength and impact qualities of the PET composition. In fact, the use of a reinforcing filler is often required by most present day commercial usage of injection molded PET. In general, any reinforcement filler can be used, e.g., fibers, whiskers, or platelets of metals, e.g., aluminum, iron or nickel, and the like, and nonmetals, e.g., ceramics, carbon filaments, silicates, asbestos, titanate whiskers, quartz, glass flakes and fibers, and the like, or mixtures thereof. Although it is only necessary to have at least a reinforcing amount of the filler present, in general, the filler will comprise from about 10 to about 160 parts per hundred of the unreinforced polyethylene terephthalate resin. Amounts of filler, especially glass fibers, in the range of from about 30 to about 140 parts per hundred of the unreinforced PET are preferred as such compositions have particularly desirable properties. From the standpoint of ease in injection molding usage, reinforced compositions of this invention, especially those using glass fibers, preferably contain a filler constituent in an amount within the range of from about 30 to about 90 parts per hundred of the unreinforced PET.

Of the various fillers that may be used in the compositions of this invention, the preferred reinforcing fillers are glass. It is most preferred to use fibrous glass filaments of lime-aluminum borosilicate glass that are relatively soda free. This is known as "E" glass. The length of the glass filaments and whether they are bundled into fibers and the fibers bundled in turn to yarns, etc., is not critical to this invention. However, it has been found convenient to use glass strands of from about ⅛ inch long. It is to be understood that during compounding considerable fragmentation of the strands will occur and thus even further reduction of length occurs in the final injection molded article.

Other additives may also be utilized in the composition of this invention to achieve certain desirable characteristics in the final injection molded product. For example, flame retardants may be added if the end use of the product requires the product to be possibly subjected to ignition sources. Flame-retarding additives which can be used for the compositions according to the invention comprise a large number of chemical compounds which are well known to those skilled in the art. In general, they contain chemical elements which are used because of their flame-retarding capacity, for example, bromine, chlorine, antimony, phosphorus and nitrogen. Preferably, the flame-retarding additives are bromine and/or chlorine containing organic compounds (optionally used together with auxiliary compounds, such as antimony trioxide, zinc borate, etc.) or elementary phosphorus or phosphorus compounds such as ammonium polyphosphate, various bromine and/or chlorine containing organic phosphate esters, hexaphenoxyphosphazene and the like.

To improve impact resistance, impact modifiers may be added to the composition of this invention. Exemplary of suitable impact modifiers are ethylene-vinyl acetate copolymers, ethyleneacrylic acid copolymers (having some of the acid functions neutralized), ethylene-methacrylic acid copolymers (having some of the methacrylic acid functions neutralized), ethylene-alkyl acrylate-methacrylic acid terpolymer (also having some of the methacrylic acid functions neutralized), ABS, methyl methacrylate grafted polybutadiene, methyl methacrylate grafted poly(alkyl acrylates), methyl methacrylate-styrene grafted rubbers, oxidized polyethylene, styrene-butadiene-styrene (S-B-S) block copolymers, styrene-butadiene multiblock copolymers, styrene-butadiene radial block copolymers, hydrogenated S-B-S block copolymers, styrenebutadiene rubber, vinyl acetate and glycidyl methacrylate, copolymers of ethylene and glycidyl methacrylate, block copolymers of butadiene, styrene, and caprolactone, acrylic rubbers, EPDM, ethylene-methyl acrylate copolymers, ethylene-ethyl acrylate copolymers, polyester-ether multiblock copolymers such as copolymers of butylene glycol, polytetramethylene ether glycol and terephthalic acid, aliphatic esters such as poly(ethylene adipate), polycarbonate, and the like. Amounts of impact modifiers generally fall within the range of from about 5 to about 25 parts per hundred parts of PET.

For protection against thermo-oxidative degradation, the customary amounts of stabilizers, preferably from about 0.001 to about 0.5 parts per hundred based upon the weight of the unstabilized composition, may be added to the compositions of this invention. Examples of suitable stabilizers are phenols and phenol derivatives, preferably sterically hindered phenols which contain alkyl substituents with up to 6 carbon atoms in the position(s) ortho to the phenolic hydroxyl group(s); amines, preferably secondary arylamines and their derivatives; phosphates and phosphites, preferably the aryl derivatives thereof; and quinones. A few nonlimiting examples include 4,4'-bis(2,6-di-tert-butylphenol),
1,3,5-trimethyl-2,4,6-tris(3,5-di-tert-butyl-4-hydroxybenzyl) benzene,
4,4'-methylene-bis(2,6-di-tert-butylphenol),
4,4'-butylidene-bis(6-tert-butyl-m-cresol),
3,5-di-tert-butyl-4-hydroxybenzylphosphonic acid diethyl ester,
N,N'-bis($\beta$-naphthyl)-p-phenylenediamine,
N,N'-bis(1-methylheptyl)-p-phenylenediamine,
phenyl-$\beta$-naphthylamine,
4,4'-bis($\alpha,\alpha$-dimethylbenzyl)diphenylamine,
hydroquinone,
p-benzoquinone,
p-tert-butylpyrocatechol,
chloranil, and
naphthoquinone.

To the compositions of this invention there may be additionally added ultraviolet ray absorbents, lubricants, anti-static agents, colorizing agents, antifungal agents, foaming agents, etc. depending upon the ultimate use of the molded product.

The compositions of this invention can be prepared by blending the various components in a blender, e.g., a tumble blender or a Henschel mixer, compounding the mixture in an extruder, e.g., a twin-screw 28 mm Werner-Pfleiderer extruder, and thereafter chopping the extrudate into pellets. The resultant product is suitable for use in injection molding operations. It is noteworthy that the compositions of this invention can be satisfactorily injection molded at mold temperatures less than 100° C. with an acceptably short cycle time and with the molded article exhibiting physical properties which are commercially attractive or which at least have commercial potential.

The present invention is further illustrated in the following examples, which are not to be construed as limiting.

EXAMPLES

The various PET compositions of these Examples were prepared by mixing the components to form a premix, compounding the premix in a single screw extruder at temperatures of about 500° F. (260° C.), and molding the pellets into an article on a reciprocating screw injection molding machine. The injection mold was suitably shaped and dimensioned for providing an article having the configuration shown in the FIG. 1 of the Drawing—which is a top plan view of the article. The mold utilized was a center gated mold having a non-moveable planar sprue side and a movable cavity side. As can be seen in FIG. 1 the article formed by the mold has a plurality of runners, labeled A, which terminate into various test pieces. Emanating from the center of the runner grid is a conventional tapered sprue. Two of the test pieces are rectangular bars and are labeled with the letter "B". These "B" bars are about six inches long, ½ inch wide and ¼ inch thick. The test piece labeled "C" in the Figure is a rectangular bar which is 2½ inches long, ½ inch wide and ⅛ inch thick. The two "dog bone" shaped test pieces are labeled "D" and are used for the testing of tensile properties. They measure about 6½ inches long, ⅛ inch thick and ¾ inch in width at each of their ends and ½ inch in width at their middles. The test piece labeled "E" is 4 inches long, 2¾ inches wide and ⅛ inch thick. The runners and sprue are approximately ⅜ inch in cross sectional width. This configuration for the test article was chosen for its com- plexity and for its yield of testable pieces which are used in accordance with well recognized standard tests. The complexity of the article configuration was also thought sufficient to give a good prediction of moldability performance of the composition when used to form typical commercial articles.

The polyethylene terephthalate, glass and other ingredients used in the various compositions of the Examples were as follows:

Polyethylene terephthalate (PET); from Goodyear Tire and Rubber Company; Vituf 5901 - crystalline PET having an intrinsic viscosity of 0.59 measured at 25° C. in solvent consisting of 60 percent by weight phenol and 40 percent by weight of tetrachloroethane.

Glass Fiber strands; Owens Corning Fiberglas, Owens Corning Fiberglas 419· AA (3/16 inch chopped strands).

Polyethylene; from Allied Chemical, Fibers and Plastic Company, Morristown, N.J. 07960, and designated as A-C 6A polyethylene.

Linear Low Density Polyethylene; from The Dow Chemical Company, Midland, Mich., 48460, and designated as Dowlex Resin 2045.

Amorphous Polypropylene; from Crowley Chemical Company, New York, N.Y., 10016 and designated as Polytac R-500.

Polypropylene; from Hercules Inc., Wilmington, Del. and designated Profax Polypropylene Grade 6523

Sodium stearate; from Witco Chemical Corporation, Organic Division, New York, N.Y. 10017 and designated as T-1 or Heat Stable grade.

Table I reports the moldability characteristics of various compositions of this invention (Examples 1–4). Table II reports on the moldability of PET compositions not utilizing the combination of this invention, i.e., either the adjuvant, or the poly-$\alpha$-olefin, or both constituents are missing from the composition (Comparative Examples 5–7). Moldability of the compositions was evaluated by determining "the number of sticks" (i.e., the number of times the molding cycle had to be stopped and a molded specimen physically removed from the mold) in relation to the "number of shots" (i.e., the number of injections) that were made with the given PET composition. In severe cases, removal of a stuck part required prying or chiseling; in less severe cases, removal was possible by hand. Table III reports the physical properties of molded articles made from the compositions of Examples 1–4.

In the Examples, the mold temperature was kept at approximately 200° F. (93° C.). All parts shown in the Tables are by weight.

TABLE I

Compositions of this Invention and Their Moldability at 93° C.

| | Example No. | | | |
| --- | --- | --- | --- | --- |
| | 1 | 2 | 3 | 4 |
| PET Resin - parts | 100 | 100 | 100 | 100 |
| Glass Fibers - parts/100 parts PET | 43 | 43 | 43 | 43 |
| A-C 6A polyethylene - parts/100 parts PET | 3.0 | — | — | — |
| Polytac R-500 (Amorphous polypropylene) - parts/100 parts PET | — | 3.0 | — | — |

TABLE I-continued

Compositions of this Invention and Their Moldability at 93° C.

| | Example No. | | | |
|---|---|---|---|---|
| | 1 | 2 | 3 | 4 |
| Profax Polypropylene Grade 6523 - parts/100 parts PET | — | — | 3.0 | — |
| Dowlex Resin 2045 (Linear low density polyethylene - parts/100 parts PET | — | — | — | 3.0 |
| Sodium Stearate - parts/100 parts PET | 0.5 | 0.5 | 0.5 | 0.5 |
| No. of sticks/No. of shots | 0/10 | 0/10 | 7/16 | 9/22 |

TABLE II

Composition Not of this Invention and Their Moldability at 93° C.

| | Comparative Example No. | | |
|---|---|---|---|
| | 5 | 6 | 7 |
| PET Resins - parts | 100 | 100 | 100 |
| Glass Fibers - parts/100 parts PET | 43 | 43 | 43 |
| A-C 6A polyethylene - parts/100 parts PET | 3.0 | — | — |
| Sodium Stearate - parts/100 parts PET | — | 0.5 | — |
| No. of sticks/No. of shots | 10/10 | 10/10 | 10/10 |

TABLE III

Compositions of this Invention and Their Physical Properties

| | Example No. | | | |
|---|---|---|---|---|
| | 1 | 2 | 3 | 4 |
| PET Resin - parts | 100 | 100 | 100 | 100 |
| Glass Fibers - parts/100 parts PET | 43 | 43 | 43 | 43 |
| Poly- α-olefin - parts/100 parts PET | 3 of A-C 6A | 3 of Polytac R-500 | 3 of Profax PP Grade 6523 | 3 of Dowlex 2045 |
| Sodium Stearate - parts/100 parts PET | 0.5 | 0.5 | 0.5 | 0.5 |
| Specific Gravity | 1.609 | 1.566 | 1.567 | 1.573 |
| Tensile Yield, psi | 21,000 | 19,400 | 20,700 | 21,700 |
| Tensile Elastic Modulus, $10^3$ psi | 1,320 | 1,360 | 1,420 | 1,370 |
| Elongation at Yield, % | <10 | <10 | <10 | N.A. |
| Flexural Strength, psi | 33,000 | 29,800 | 31,600 | 32,800 |
| Flexural Elastic Modulus, $10^3$ psi | 1,410 | 1,360 | 1,360 | 1,370 |
| Izod Impact - ¼ in. bar, ft-lb/in | 1.7 | 1.8 | 1.9 | 1.8 |
| Izod Impact - ⅛ in. bar, ft-lb/in | 2.9 | 2.9 | 2.1 | 2.1 |
| Vicat Softening Point, °C. | 248 | N.A. | 251 | N.A. |
| Heat Deflection Temp., °C. @ 264 psi | 237 | 235 | 234 | 238 |
| Heat Deflection Temp., °C. @ 66 psi | 249 | 255 | 255 | 256 |
| Rockwell Hardness, R scale | 120 | 121 | 122 | 121 |

N.A. = data not available

As can be seen from Table II, the absence of either the poly α-olefin or the adjuvant resulted in a composition which in every case stuck in the mold and necessitated stoppage of the molding operation. In sharp contrast, the presence of both such ingredients in the composition resulted, under the same molding conditions, in no or reduced sticking.

The data shown in Table III illustrate the good balance of physical properties exhibited by articles injection molded from compositions of this invention. The injection molded test specimens used to evaluate the physical properties were part of the articles produced in Examples 1-4 and were tessted according to the follwig ASTM procedures:

Specific Gravity—D 792-66 (1975)
Tensile-Yield, Elongation & Tensile Elastic Modulus—D 638-77a
Flexural Strength & Flexural Elastic Modulus—D 790-71 (1978)
Izod Impact—D 256-73
Heat Deflection Temperature—D 648-72 (1978)
Vicat Softening Point—D 1525-76
Rockwell Hardness—D 785-65 (1976).

1. A thermoplastic composition which is injection-moldable at a relatively low mold temperature, said composition comprising an intimate admixture of:
   (a) polyethylene terephthalate having an intrinsic viscosity in the range of 0.4 to 0.9 as measured at 25° C. in a solvent consisting of 60% by weight of phenol and 40% by weight of tetrachloroethane;
   (b) polyethylene having a viscosity within the range of from about 150 to about 700 centipoise as measured at 140° C. with a Brookfield viscometer, present in an amount within the range of from about 0.5 to about 12 parts per hundred parts of the polyethylene terephthalate;
   (c) an adjuvant synergistically cooperative with the polymer of (b) to improve the releasability, from the injection mold, of articles injection molded from said composition at mold temperatures of at least as low as 93° C., said adjuvant being a sodium or potassium salt of a substantially saturated aliphatic monocarboxylic acid containing from about 12 to about 36 carbon atoms in the molecule present in an amount within the range of from about 0.05 to about 5 parts per hundred parts of the polyethylene terephthalate; and
   (d) at least one reinforcing filler present in amount of from about 10 to about 160 parts per 100 parts by weight of the polyethylene terephthalate.

2. The composition of claim 1 wherein said salt is a sodium salt.

3. The composition of claim 1 wherein said salt is sodium stearate.

4. The composition of claim 1 wherein said reinforcing filler is glass fibers.

5. The composition of claim 1 wherein said polethylene is present in an amount within the range of from about 2 to about 8 parts per hundred parts by weight of said polyethylene terephthalate and said adjuvant is present in an amount of from about 0.1 to about 3 parts per hundred parts by weight of said polyethylene terephthalate.

* * * * *